(12) United States Patent
Rehwinkel

(10) Patent No.: US 9,968,173 B2
(45) Date of Patent: May 15, 2018

(54) METHOD FOR PRODUCING FINGERNAIL TIPS

(71) Applicant: Hermann Hogg, Sasbach (DE)

(72) Inventor: Carsten Rehwinkel, Meissenheim (DE)

(73) Assignee: Hermann Hogg, Sasbach (DE)

( * ) Notice: Subject to any disclaimer, the term of this patent is extended or adjusted under 35 U.S.C. 154(b) by 335 days.

(21) Appl. No.: 15/054,169

(22) Filed: Feb. 26, 2016

(65) Prior Publication Data

US 2016/0174681 A1 Jun. 23, 2016

Related U.S. Application Data

(63) Continuation of application No. PCT/EP2014/002348, filed on Aug. 29, 2014.

(30) Foreign Application Priority Data

Aug. 30, 2013 (DE) ......................... 10 2013 109 477

(51) Int. Cl.
*A41G 1/00* (2006.01)
*B29C 65/00* (2006.01)
(Continued)

(52) U.S. Cl.
CPC ............ *A45D 31/00* (2013.01); *B29C 70/504* (2013.01); *B29C 65/4835* (2013.01);
(Continued)

(58) Field of Classification Search
CPC .. A45D 31/00; A45D 2031/005; B29C 70/00; B29C 70/28; B29C 70/42; B29C 70/50; B29C 70/504; B29C 70/52; B29C 70/521; B29C 70/525; B29C 70/46; B29C 65/483; B29C 65/4835; B29C 65/4845; B29C 65/524; B29C 65/525; B29C 65/526; B29C 2793/009; B29L 2031/003; B29L 2031/718; B29D 99/0003
USPC ..... 156/60, 61, 67, 166, 180, 181, 196, 199, 156/200, 212, 221, 222, 224, 242, 244.11, 156/244.18, 244.19, 246, 247, 250, 269, 156/270, 272.2, 275.5, 275.7, 277, 289, (Continued)

(56) References Cited

U.S. PATENT DOCUMENTS 4,157,095 A * 6/1979 Sweet .................... A45D 31/00
132/73
4,445,957 A * 5/1984 Harvey ................... B29C 43/08
156/180

(Continued)

*Primary Examiner* — Philip C Tucker
*Assistant Examiner* — Brian R Slawski
(74) *Attorney, Agent, or Firm* — Patricia Mathers; Jeffrey Joyce

(57) ABSTRACT

An automated method for producing fingernail tips. Reinforcing fibers are provided as a strip and the strip is moved at a specific travel rate in the longitudinal direction of the strip. The strip is covered on one side and impregnated with the plastic, and then shaped in a shaping station, where is it bent into a curve that corresponds substantially to the shape of a natural fingernail or toenail. The strip maintains its shape after the plastic is cured and the covering is then removed. The fingernail tips are punched from the strip in a cutting station. The automated method allows the strip to be continuously or virtually continuously transported and then the fingernail tips to be automatically counted, sorted, and packaged.

25 Claims, 2 Drawing Sheets

(51) Int. Cl.
*B32B 37/00* (2006.01)
*B31F 1/00* (2006.01)
*B29C 51/16* (2006.01)
*B29C 51/14* (2006.01)
*B29C 47/00* (2006.01)
*B32B 38/10* (2006.01)
*B32B 38/04* (2006.01)
*C09J 5/02* (2006.01)
*B65C 9/25* (2006.01)
*B29C 67/00* (2017.01)
*B29C 35/08* (2006.01)
*B29C 53/00* (2006.01)
*B29C 47/92* (2006.01)
*B29C 67/20* (2006.01)
*B29D 7/00* (2006.01)
*B29C 55/00* (2006.01)
*A45D 31/00* (2006.01)
*B29C 70/50* (2006.01)
*B29C 65/48* (2006.01)
*B29C 70/52* (2006.01)
*B29C 70/46* (2006.01)
*B29L 31/00* (2006.01)

(52) U.S. Cl.
CPC .......... *B29C 65/4845* (2013.01); *B29C 70/46* (2013.01); *B29C 70/521* (2013.01); *B29C 2793/009* (2013.01); *B29L 2031/718* (2013.01)

(58) Field of Classification Search
USPC ........... 156/296, 307.1, 307.3, 324; 264/464, 264/477, 129, 134, 136, 137, 138, 139, 264/145, 148, 151, 157, 160, 40.7, 165, 264/171.1, 172.11, 173.11, 175, 212, 213, 264/214, 216, 280, 285, 299, 339
See application file for complete search history.

(56) References Cited

U.S. PATENT DOCUMENTS

| | | | | |
|---|---|---|---|---|
| 4,459,753 | A * | 7/1984 | Nagasawa | B29C 70/50 33/701 |
| 5,803,094 | A * | 9/1998 | Becker | A45D 31/00 132/200 |
| 7,185,660 | B1 * | 3/2007 | Han | A45D 31/00 132/200 |
| 2014/0090658 | A1 * | 4/2014 | Malon | A45D 31/00 132/200 |
| 2015/0210001 | A1 * | 7/2015 | Kruse | A45D 31/00 156/436 |

* cited by examiner

METHOD FOR PRODUCING FINGERNAIL TIPS

BACKGROUND INFORMATION

Field of the Invention

The invention relates to a method of manufacturing fingernail tips.

Discussion of the Prior Art

WO 2012/103880 A2 discloses a conventional method for manufacturing fingernail tips. These fingernail tips are used for constructing an artificial fingernail. They serve to lengthen the existing natural fingernail and thereby create a base on which the artificial fingernail is subsequently affixed by means of a hardenable gel. The final shaping is then done on the artificial fingernail. When these fingernail tips are not used, then a template is used to support the applied gel until it has hardened. Use of the fingernail tips enables a procedure for constructing the artificial fingernail that is quicker, less complicated, easier to implement.

The fingernail tips according to the state of the art are produced by embedding fiberglass reinforced fibers in a first form or mold and applying a resin to the fibers. The resin is pressed into the reinforcing fibers by means of a second form that has a complementary shape to the first form, thereby pressing the resin and the reinforcing fibers between these two forms against each other and thereby impregnating the reinforcing fibers with the resin.

DE 10 2012 015 207 B3 also discloses a conventional method for manufacturing an artificial nail preparation. With this method, flat fabric sheet is pulled from a roll, guided into an immersion bath, and in this way saturated with a liquid synthetic resin. The sheet is then shaped into a series of wave-like contours and hardened, thereby created a series of grooves or channels that extend across the entire width of the sheet and also transverse to the direction of travel of the sheet when it is processed. These grooves are eventually separated from the sheet, each cut piece serving as a blank for an artificial nail preparation.

BRIEF SUMMARY OF THE INVENTION

It is an object of the invention to improve a conventional method for manufacturing fingernail tips such, that the improved method enables the manufacture of large quantities of fingernail tips in a cost-effective way.

The inventive method provides a continuous or virtually continuous production process. The reinforcing fibers are initially provided as a flat band or strip that is moved in its longitudinal direction with a pre-determined forward travel speed. This strip of reinforcing fibers is impregnated with a plastic, for example, with a synthetic resin, so that the strip now contains at least two components, the reinforcing fibers and the plastic. This type of strip is referred to in the industry as a "prepreg."

The strip is covered at least on one side, because the delicate reinforcing fibers, which are generally provided, for example, as a fleece, can withstand only slight mechanical stresses, such as, for example, tensile forces. The covering is made of mechanically more resistant material to protect the fibers and the two components are rolled into a roll.

The strip that now has a covering on one side is impregnated with the plastic and molded into a curved shape that corresponds essentially to the curve of a natural fingernail or toe nail. The strip is shaped and the plastic is cured while the strip is being moved forward, so that the production is a continuous process.

The groove, which, in the state of the art is referred to as the nail preparation blank, is shaped according to the present invention as the strip is traveling in the longitudinal direction, thereby supporting the continuous production process and creating a practically endless nail preparation blank, a blank that is as long as, for example, the rolled up strip of reinforcing fibers.

According to the invention, the fingernail tips are cut from this virtually endless groove, i.e., from the strip, at a cutting station. A large number of fingernail tips can be cut from the length of the fingernail blank, i.e., the groove. This allows a cost-effective, continuous and automatic production of fingernail tips. The cutting can be done, for example, by means of a stamp or punch process and be done either continuously, by means of a rotating cutting tool that has at least one cutting tool on its circumference. The cutting step can alternatively also be done "virtually continuously," namely, with an intermittent, for example, oscillating, cutting tool that is practically constantly in motion because of its back and forth motion. With this virtually continuous cutting process, the strip continues to travel outside the cutting station continuously, but is only fed into the cutting tool in the cutting station intermittently, as will be explained in greater detail below.

The method according to the invention also provides a means for a fully automated sorting of the fingernail tips. In this context, sorting refers to an allocation of the manufactured fingernail tips to specific containers or locations. For example, the manufactured fingernail tips can be counted and a specific number of tips be allocated to a particular container, so that a specified piece count is packed in the container, for example in bags, cans, cartons, etc. Alternatively, the method of counting tips can be based on weight. In this case, the manufactured fingernail tips are weighed and a certain weight of tips is packed into the packaging or the container.

The tips may be manufactured in varying sizes, in which case, the fully automated sorting is done taking size into consideration. For example, a pre-determined quantity of tips of a certain size, determined either by number or by weight, is packaged separately from tips of other sizes. Various sizes of the tips can be sorted into corresponding various compartments of a common packaging or container: For example, a so-called assortment box with a plurality of individual compartments can be provided in the travel direction of the tips, for example, beneath the mentioned punch in the cutting station. The fingernail tips deposited into the assortment box, for example, by letting them fall by gravity from the punch into the assortment box, and into a pre-determined compartment. To achieve this, the assortment box may be moved, so that the specific compartment to be filled is placed under a chute or a similar transport device that guides the tips from the cutting device to the packaging. Or the transport device can be movable and moved from a first compartment to another compartment of the assortment box. In any case, various sizes of fingernail tips may be sorted fully automatically into different packaging or different compartments of the same packaging.

The correct metering of the fingernail tips into the individual packaging or its compartments may be done by means of an automated counter, which counts the fingernail tips automatically as they come from the cutting station, or by means of a scale, onto which the fingernail tips are initially placed and accumulated there, and which is regularly emptied, when a certain volume by weight of fingernail tips has accumulated.

The tips to be manufactured are referred to hereinafter only as "fingernail tips", because the majority of artificial nails are applied to natural fingernails. It is, however, understood that artificial nails may also be applied to toe nails and that the designation "fingernail tips" does not limit the scope of the present invention to tips for artificial fingernails. The tips manufactured according to the invention are also suitable for toe nails, depending on their dimensions.

The curvature that is applied in the shaping station to the strip corresponds to the curvature of a fingernail or a toe nail. This curved shaping of the fingernail tips avoids any tension being created on the natural nail, later, when the artificial nail is subsequently produced. This lack of tension increases, on the one hand, the wear comfort and facilitates the most reliable adhesion of the artificial nail to the natural nail. Also, hollow spaces, which can otherwise hide germs, are avoided by a gapless, tight fit of the tip to the natural nail, so that this tight fit reduces, for example, the danger of infections or fungal disease.

The plastic on the strip is hardened to the predefined shape that is applied to the strip in the shaping station, so that subsequently the strip is rigid and retains that shape. The strip, i.e., the reinforcing fibers with the hardened plastic, retains an elastic deformability, however, which facilitates the exact fit of the tip to the natural fingernail. The duration of the curing process depends on the desired goal, which is to obtain a strip that is sufficiently form-rigid, later, so that it can leave the shaping station. The curing of the plastic does not have to be fully completed in the shaping station, however, but rather, only has to be hardened to the extent that the shaped strip maintains its shape by the time it leaves the shaping station. In other words, it may be cost-effective to post-curing of the plastic to its completely hardened state only after the strip has passed through the shaping station. If plastic is cured thermally, for example, and the strip is heated when it passes through the shaping station, the temperature of the strip itself is used for the post-curing. In this case, not only the heat stored in the reinforcing fibers and the plastic, but also in the two coverings is used. This internal temperature of the strip effectively provides a final curing of the plastic, while the strip is leaving or has left the shaping station.

It may be desirable, for reasons of process-reliability, to fully harden the plastic while it is still in the shaping station, because this reliably ensures that the strip has attained the desired stability in shape. The same good process reliability may also be achieved by not completely hardening the plastic in the shaping station, but rather, guaranteeing that the plastic is completely cured in a post-curing station that is downstream from the shaping station. Thus, it is possible to combine two different curing processes, i.e., to apply a different curing process in the shaping station than is used in the post-curing station.

When the strip has passed through the shaping station, the plastic has been sufficiently cured to allow the covering to be removed—and preferably, this is done only after the plastic has been completely cured, so that now the shaped strip consists only of the reinforcing fibers and the cured plastic.

The fingernail tips are then automatically cut from this strip in a cutting station. A person of skill in the art is familiar with many cutting methods. The cutting step may be done, for example, with a punch tool, to achieve the most cost-effective production of the fingernail tips. Either an oscillating punch or a punch wheel that carries multiple punches on its periphery and cuts with a continuous rotating action is a suitable cutting device, because both of these enable a high-speed punch process.

Advantageously, the strip containing the reinforcing fibers may have a covering not just on one side, but on both sides. Covering both sides of the reinforcing fibers and the plastic has the effect, first of all, of protecting the plastic against environmental influences and impacts. For example, the ambient air works as an inhibitor for certain synthetic resins and impedes the curing process. Covering both sides also has the effect of protecting the environment from the strip and the materials in its composition. For example, the equipment that is used to process the impregnated strip is protected by the coverings against contaminants and sticking, things that could otherwise occur because the plastic is not yet completely cured and could negatively effect how the equipment functions.

If a covering on one side only is provided, the mentioned inhibition in curing that can be caused by the ambient atmosphere may be prevented by curing in an air-free environment in a form that tightly encases the strip, or by curing the strip together with the form in a room or container that is sealed against the ambient atmosphere. For example, the strip that is impregnated with the plastic and covered on one side may be rolled up into a roll and this roll placed in such a sealed room or container, which is then subsequently evacuated or flooded with an inert gas. The prepreg that is covered just on one side is then drawn from the roll and then cured, without the inhibitory effects of the ambient atmosphere.

For illustration purposes only, a method is described below in which the strip of reinforcing fibers is covered on both sides. It is understood, however, that the method according to the invention is not limited to processing a strip with a covering on both sides.

Advantageously, the rolled strip of reinforcing fibers is provided on a reel or roller, so that the strip can be drawn from the roll. The two coverings are also provided as rolled goods on reels and each drawn from their respective roll. This enable a process that runs as continuously and smoothly as possible. Also, it is possible to optimally control any tensions exerted on the strip, if the reel for the rolled strip is constructed as a braked or driven idler. Tension control on the strip of reinforcing fibers ensures that the pre-determined maximum tension on the strip is not exceeded, to avoid overloading or damaging the strip.

Overloads on the covering for one or both sides are also avoided by means of a tension control. In addition, the tension of both coverings may also be adjusted to be substantially the same, thereby avoiding any distortion and undesired deformation of the triple-layer prepreg. Thus, the admissible maximum tension of a covering depends on the tension that is momentarily applied to the other covering.

It may be advantageous to apply the plastic indirectly to the reinforcing fibers: In this case, the plastic is not applied directly to the strip, but rather, to one of the two coverings. The strip of reinforcing fibers is subsequently brought into contact with the side of the covering that has the plastic. For example, the process steps include drawing a strip-like covering from a roll, applying a liquid plastic to its upper side, and then placing the strip of reinforcing fibers against the side of the covering that is coated with liquid the plastic.

This method of indirect coating allows the amount of plastic to be precisely, because the carrier film that serves as the covering and is to be coated essentially has a more uniform thickness than the strip of reinforcing fibers. Complete impregnation of the reinforcing fibers is made possible by pressing the strip against the covering, thereby pressing it into the still-liquid plastic. The reinforcing fibers may then be brought into contact with the liquid plastic of uniform thickness, in a particularly gentle manner, without pressure. The reinforcing fibers soak up the liquid on their own.

Precise metering of the plastic may be achieved by using a coating roller to apply the plastic. The coating roller has in a known manner an adjustable drawing gap, so that the amount of the plastic may be adjusted very precisely. Compared to spray methods, such a rolled application of the plastic onto the covering effectively provides precise metering, even with variable external ambient influences. For example, the viscosity of the plastic can be influenced by the ambient temperature. If the method of application is to spray the plastic through a comparatively small spray jet, the ambient temperature has a definite influence on the amount of liquid that goes through the jet. A method using a coating roller can overcome such weather-dependent fluctuations, because the adjustable drawing gap allows the coating roller to be quickly and easily adjusted to the different metering conditions. For example, the gap may be adjusted to accommodate different material qualities and viscosities, as well as temperature conditions.

Advantageously, the strip may also be calendared. In order to eliminate inclusions of air as fully as possible from the strip, passing the strip through corresponding calendar rollers before the strip goes into the shaping station and before the plastic is cured allows the plastic to completely impregnate the reinforcing fibers and also forces air out of the fibers. Further, it is possible by means of calendaring to remove and capture excess plastic. When the plastic is being applied as mentioned above, indirectly as a coating initially of a covering, for example, a certain excess amount of plastic may be metered out, intentionally, in order to ensure that all areas of the reinforcing fibers are completely impregnated with the plastic. This intentional excess metering of the plastic is able to compensate for variations in the tolerances in the reinforcing fibers and ensures that the reinforcing fibers are thoroughly soaked in the calendaring station.

Advantageously, this mentioned calendaring may be done before the second covering is applied, i.e., when a covering is applied to one side only, so that the second covering does not impede the expulsion of air bubbles in this calendaring process. But then, it may be advantageous to provide an additional calendaring step, after the second covering has been applied to the strip. This second calendaring removes air bubbles that would otherwise be found between the reinforcing fibers that are soaked with the plastic and the second covering. Such air bubbles wouldn't negatively influence the complete impregnation of the reinforcing fibers with the plastic, but could have a negative influence on achieving the smoothest possible rendering of the surface of the product to be manufactured. Because this product is used particularly in the cosmetic industry, i.e., in an industry in which aesthetics is of utmost importance, the external appearance of the fingernail tips to be manufactured, including their smoothness, are also of great importance.

In the simplest case, when shaping the strip before the plastic has cured, the strip may be drawn during its forward travel across a single-component shaping tool, in order to take on the shaping of this shaping tool. For example, such a single-component shaper may consist of a convex curved elongate element, for example, a rod, a tube, or something similar, that extends in the longitudinal direction of the strip. When the strip in the longitudinal direction is placed on such a convex body, the strip is initially formed in its longitudinal direction to a channel or groove that is open toward the bottom, i.e., has a C-shaped arched contour that extends transverse to the longitudinal direction, and the shaping tool lies against the inner surface of the groove.

Similarly, the strip, while it is being transported, may be pulled into a single-component shaper that is constructed as a channel or groove, for example, into the inside of a pipe or a channel, so that, in this way, the strip is shaped channel-like and the shaping tool lies against the outer surface of the channel.

A single-component shaper may also be provided that has a slot cut through it, so that the strip is pulled through the slot during its forward travel, thereby shaping the strip. For example, the single-component shaper may be metal block and the slot machined by spark erosion. The slot may have a C-shaped curved contour that extends transverse to the forward travel direction. The plastic may also be cured thermally in the shaper by heating the metal block so that the heat transfers to the strip that is running through the block. The dimensions of the slot may be selected to ensure that the complete surface area of both sides of the strip makes contact with the shaper, so as to facilitate heat transfer.

Advantageously, however, the shaper may comprise two parts: according to a first advantageous embodiment of such a shaper, the two parts together form a C-shaped curved gap. The curvature of this C-shaped gap extends transverse to the longitudinal direction of the strip. In this way, the desired C-shaped curved, groove-like contour is imparted to the strip as it is traveling through this shaper.

The two parts of the shaper may, for example, be heated, when thermal curing of the plastic is intended; otherwise, if the plastic is to be cured by radiation, they may be constructed to be light-transparent material that is permeable to the specific type of radiation, for example, may be made of glass or a transparent ceramic material.

The two parts of the shaper may be arranged to be stationary, so that the strip is slidingly drawn through the C-shaped gap. If the strip has a covering on both sides, the covering may be selected to ensure the desired sliding properties relative the shaper. Alternatively, the two parts of the shaping tool may be rotatably constructed as rollers or cylinders that between them form the C-shaped gap and through which the strip is drawn, and depending on the circumferential velocity of the rollers, with little friction or no friction.

The two-part construction of the shaper allows a process by which the width of the gap is adaptable and, for example, may be adapted to the production tolerances of the strip. Optimal shaping and possibly also heat transfer is achieved by having the two parts lie as closely as possible against the strip traveling through the shaper. On the other hand, having a sufficient distance between the two parts of the shaper may reduce the pull resistance that the shaper exerts on the strip to the extent that overloading the strip is avoided, overloading possibly resulting in uncontrolled deformations or mechanical damages on the strip.

The shaper may be provided as an adjustable tool, so that the width of the gap is changeable and may be adjusted to various settings, which are held until the next time the shaper re-adjusted.

Alternatively, the necessary width of the C-shaped gap may be continuously and automatically adapted, as the strip is drawn through the shaper, for example, by using a spring force to press the two parts of the shaper against each other or using the inherent weight of an upper part of the shaper to lie against a lower part. In this case, the strip traveling through the shaper forces the two parts of the shaper apart, thereby automatically determining the gap width. It is, thus, an engineering design choice, whether the strip forces the two parts apart or whether a spring force or the inherent weight of one of the parts determines the gap width.

A further alternative to a shaping station that has a shaper with two parts is to construct the two parts of the shaper in the form of guide rollers that are arranged spaced apart from each other and one behind the other in the longitudinal direction of the strip. These two guide rollers have a convex or concave profile along the outer circumference, so that the section of the strip between these two guide rollers forms a groove. Because no additional components of the shaper have to contact the strip between these two guide rollers, the strip is particularly readily accessible in this area, in order to enable curing the plastic while the strip is continuing to be transported.

The structural dimensions of the shaper and the travel speed of the strip influence the time that is available for curing the plastic. The longest possible process time may be achieved by moving the shaper in the travel direction of the strip. In this way, compared to a shaper of the same size that is stationary, the process time during which the strip takes on its desired shape imparted to it by the shaper may be extended. The relative speed between the shaper and the strip is reduced in this way, compared to the relative speed that the strip would have to the stationary shaper, namely, the travel speed of the strip.

Advantageously, the shaper moves essentially at the same speed that the strip is moving, i.e., with the travel speed of the strip. This essentially avoids creating a relative speed between the strip and the shaper. Optimally, a relative speed between the strip and the shaper is avoided, by setting the speed with which the shaper is being moved to correspond precisely to the speed with which the strip is traveling. If there is no relative speed between the strip and the shaper, it is then possible to apply a strong press action of the shaper on the strip, because the shaper that is moving at the same speed as the strip does not exert any inadmissibly high pull resistance. This enables a particularly intensive heat transfer from the shaper to the strip, and thus, a particularly short curing time. The press action also enables a three-dimensional shaping of the strip, so that individual strip segments may be shaped like a natural fingernail, curved in both the length and width directions.

The movability of the shaper may be made possible by having the two shaping parts take up the strip between them and then transporting these two shaping parts together with the strip. In a discontinuous process, these shaping parts may subsequently be moved back to their start positions, placed on a not yet shaped section of strip, and then, as described, moved along together with the strip. Alternatively, however, the shaping parts may be constructed to be relatively short, and multiple shaping parts arranged serially one behind the other, so that the two parts of the shaper are constructed similarly to the circulating chain of a tracked vehicle.

The section of such a part that is in contact with the strip is moved at the travel speed of the strip and, in this way, supports a continuous manufacturing process in which the strip continuously travels through the shaping station. The two guide roller previously mentioned and spaced apart from each other that are used to shape the strip may also advantageously be rotationally supported or rotationally driven, so that they may be adapted to the travel speed of the strip and so that there is no relative movement at the place of contact between the respective guide roller and the strip.

Reducing or avoiding a relative speed between the shaper and the strip reduces the forces that are necessary to move the strip through the shaping station, and the mechanical loads or stresses applied to the strip are accordingly gentle. Also, the reduction or avoidance of the relative speed between the strip and the shaper means that friction and the distortions on the strip that result from the friction, which could lead to a reduction in quality, are excluded as far as is possible.

It may be advantageous to heat the shaper if, as previously discussed, the plastic is to be thermally cured. This ensures that the shaping of the strip is optimal and particularly reliable, because the shaper contacts the strip from both sides, if possible, and thereby effects a particularly defined and precise shaping of the strip. At the same time, the shaper, because it is heated, contributes to thermally curing the plastic and enables the least possible loss of heat from the plastic in the shortest possible path.

If the plastic is to be cured by means of radiation, as previously discussed, then this can be done with heat radiation or, for example, ultraviolet radiation, or radiation in the blue light range. The plastic is cured in the shortest time possible with this energy-intensive radiation. In this case, at least one of the two coverings is permeable to the radiation, namely, the covering that is facing the radiation. Advantageously, the plastic may be cured particularly quickly when both coverings are permeable to the radiation and the radiation is applied to both sides of the strip.

Advantageously, the covering is not only permeable to the radiation that is being used, but also resistant to this radiation. Indeed, it is possible to provide a covering that dissolves under the effects of the radiation, because it is possible that, as the covering drops away as a protection, the plastic has already cured and the protective covering is no longer needed. Advantageously, though, the covering remains just as before, so that it can later be removed from the strip under controlled conditions and possibly re-used.

The described embodiments of the shaping station reveal that the strip from the beginning until after the shaping station is continuously travelling, thereby supporting a continuous production of the fingernail tips. The strip is continuously traveling forward in the shaping station, too. If the shaping station operates in an oscillating manner, in that it moves in a cycle together with the strip and then is moved back to a home position, the shaping and curing then occurs in a virtually continuous and clocked manner, but the forward travel of the strip remains continuous.

Removing the strip from the shaping station is done advantageously by means of an extraction device that is placed subsequent to the shaping station. The plastic is now cured, so the strip is significantly more robust with regard to mechanical loads, so that it can be grabbed and pulled out of the shaping station at this point.

This extraction device may also serve as the master drive, so that the travel speed of the strip of reinforcing fibers as well as the travel speed of the two coverings that are guided to the strip may be regulated as a function of this master drive. The strip is already cured at this point and is accordingly mechanically resistant, so it can be securely grabbed with a high contact pressure by the rollers of the extraction device and be transported without slippage. For this reason, the extraction device may serve as the master drive within the entire apparatus.

Advantageously, the strip may be guided in a loop, after the coverings have been removed from both sides and before the strip reaches the cutting station. The loop is created by a deflecting roller and, because the position of the deflecting roller is changeable, the length of the loop is changeable accordingly. This creates a type of buffer or intermediate storage for the strip in front of the cutting station. If a discontinuous cutting process takes place in the cutting station, for example, by means of an oscillating punch, then the strip may be guided though the cutting station in a corresponding discontinuous manner and be stopped for each individual cutting operation. During this stop time, the strip that is continuously traveling out of the shaping station is temporarily taken up and stored in the mentioned buffer. Even when, in the same process line, different fingernail tips are to be created one after the other, and different cutters, for example, are required to do this, the strip may be drawn from the shaping station in a continuous manner, just as before, while the cutting tool is being changed, whereby during the time of the tool change, the cured strip coming from the shaping station is stored temporarily in the buffer.

In addition and advantageously, the operating speed of the cutting tool in the cutting station may be regulated as a function of the position of the deflecting roller of the buffer i.e., with variable speeds. In this way, the cutting tool may be operated as slowly as possible, which is advantageous as far as energy and wear on the tool is concerned, but then be operated as fast as necessary, in order to process the shaped and cured strip, without incurring an inadmissible pile-up of the strip. The operating speed of the cutting tool can may controlled in a known manner by means of an automated machine control, so that the cutting process operates at the same even speed to the benefit of an optimal cutting result, although the cutting tool is operated with interruptions of varying duration between two cutting steps. To achieve this, a signaling sensor is used to detect the position of the deflecting roller. The corresponding signal may, for example, form the input variable of the mentioned machine control. The speed of the cutting tool may be automatically adapted when the deflecting roller moves between two specified limit values, in order to avoid that these two limit values are exceeded.

When an oscillating cutting tool is used, work is discontinuous in the area of the cutting station, so that overall, the production process is a virtually continuous process, because the cutting step is done on a section of the strip that is not moving. The more the process steps can be continuously carried out, the more even and technically advantageous the production, which also has an economic advantage. The cutting station may also be operated as a rotating cutting fixture, in contrast to the described oscillating cutting fixture. The rotating cutting fixture has cutting tools or punches mounted around the circumference of a roller or drum, so that the cutting station, too, may be operated in a continuous manner.

Advantageously, the fingernail tips that are punched from the cured strip may be automatically counted and packaged. For example, the tips inside the cutting station may drop downward, the drop facilitated by force of gravity or by an air current, and drop past a light barrier, so that the number of the produced fingernail tips is counted automatically. As soon as a specified number of fingernail tips has dropped into a container, the container is replaced automatically, so that a specified number of fingernail tips is gathered in the available container before it leaves the cutting station. This filled container is then preferably packed automatically, thereby making a plurality of fingernail tips ready for shipping in a cost-effective manner.

Different fingernail tips may be produced from a strip having the same radius of curvature by cutting tips of varying sizes from the cured strip. Also, the strip may be shaped with varying radii of curvature that extend transverse to the longitudinal direction, so that between these two parameters, radius of curvature and size, it is possible to provide a multiplicity of different fingernail tips, tips that are optimally adapted to specific curves of natural nails. When, as described, for example, by means of a shaper that travels with the strip, the strip is also shaped in its longitudinal direction, possibly with different radii of curvature, the possible number of variations is significantly increased and, thus, the adaptation of the tips to the natural nail shape further improved.

Multiple shapers and/or multiple cutters for fingernail tips may be kept on hand in a production line, for the benefit of the most cost-effective production possible. Either the shaper and/or the cutter is changed out for another tool with a different geometry. In this way, differently shaped fingernail tips, i.e., tips with different radii of curvature and/or different sizes, can be produced from the same originally provided strip of reinforcing fibers.

It is possible to collect and package a number of different sizes fingernail tips to a set, i.e., an assortment of tips. This may be desirable, when the consumer is a cosmetic studio, for example. For this purpose, multiple production lines may be provided, with are operated in parallel and in which, for example, the strips are shaped with different radii of curvature. It is also possible to increase the differentiation of the differently formed fingernail tips by changing the cutter on these production lines. An assortment carton having multiple compartments may be positioned beneath the cutting station of each production line, so that, depending on the cross-section curvature and the size of the fingernail tips, the produced fingernail tips can be transported into specific compartments of these assortment cartons, whereby an automated conveyor device is used to position the assortment cartons under the cutting station, such, that a certain type of fingernail tips is deposited in a certain compartment of the respective assortment cartons.

Aside from the fact that several similar types of production lines may be operated in parallel, in order to produce a plurality of fingernail tips simultaneously, it is also possible to separate the strip of reinforcing fibers that is drawn from a roll into several parallel strips and to process these several strips next to each other at the same time. This effectively multiplies the production capacity accordingly, without increasing the need for greater floor space, as would be the case if multiple, fully separate production lines needed to be set up.

Basically, the strip, which initially consists of the reinforcing fibers and then also the plastic and the two coverings, may be constructed to be so narrow, that only a single fingernail tip can be cut from this narrow strip, so that the production of multiple fingernail tips can only be done serially along the length of the strip, one behind the other. Conversely, it is, of course, also possible to have a wider strip, so that several fingernail tips may be produced side by side at the same time.

The reinforcing fibers are preferably polyester fibers, glass fibers, or nylon fibers. These make it possible, particularly when a synthetic resin that cures transparently is used as the plastic, that the reinforcing fibers are practically invisible within the transparent plastic. As a result, the fingernail tips that are produced are almost transparent and the reinforcing fibers are hardly visible. Although the fingernail tips will later be covered over by the subsequently constructed artificial fingernail, for example, with the help of a hardening gel, and by a subsequent nail polish or similar refinement of the artificial fingernail, it may be advantageous, especially for longer nails that extend beyond the ends of the finger tips, that the reinforcing fibers be invisible. This is particularly the case when looking at the underside of the fingernail, namely, at the underside of the artificial fingernail, where one can see the fingernail tip.

The reinforcing fibers may be provided advantageously in the form of a fabric, so that, compared to a fleece or a mat of unaligned fibers, the quality of the material of the strip is as constant as possible, which facilitates a continuous and the most possible even processing of the strip.

Because the fingernail tips are going to be subsequently coated with a hardening gel anyway, the fingernail tips may be produced advantageously to be as thin as possible. This facilitates their formability and thus allows optimal adaptation of the fingernail tips to each presented natural fingernail. For that reason, advantageously, a strip made of a material quality of 15 to 200 g/m$^2$ and with a thickness of 0.02 to 0.2 mm may be used. Typically, this fabric can have a material strength, i.e., thickness, of 0.05 mm.

Aside from the fact that the plastic may be applied indirectly as a coating to the reinforcing fibers, the plastic may also be sprayed onto the material with the reinforcing fibers, or be directly applied to the reinforcing fibers with a squeegee, a knife, or a roller, or, as hinted at, by a submersion process/padding process. With all the known coating methods, as described in detail above for the preferred method, the plastic may be applied to the reinforcing fibers indirectly, i.e., not applied directly to the reinforcing fibers, but to an intermediate carrier, for example, one of the two coverings, and that subsequently the reinforcing fibers are brought into contact with the plastic.

In addition to the two mentioned calendars, it may be advantageous, to provide additional calendaring stations, in order, on the one hand, to intensively soak the reinforcing fibers with the plastic and, on the other hand, after the reinforcing fibers are soaked and both sides are protected with a covering, to drive out air bubbles. This is a particularly advantageous way to obtain, on the one hand, the most constant and optimal material quality possible. For example, four calendaring stations may be provided and, depending on where the calendaring stations are placed, may be used with the greatest possible effectivity to impregnate the reinforcing fibers with the plastic, as well as drive out air bubbles, as well as, if needed, drive excess plastic out of the reinforcing fibers.

The covering on both sides of the strip is advantageously a protective polyester film. On the one hand, this material may be easily separated out after the plastic has cured, but also, this material, depending on its composition and having a melting range from 220 to 260 degrees Celsius, maintains a high degree of temperature stability. This means that it is possible to cure plastic that has been impregnated into the reinforcing fibers without damaging the two coverings on both sides of the strip.

Also, a protective polyester film with the appropriate low material strength, i.e., thickness, but which still has sufficient mechanical strength, is sufficiently transparent, for example, to the ultraviolet radiation or blue light radiation, so that it is possible to photochemically cure the plastic.

The low material thickness of the strip makes it possible to easily shape the strip elastically after the plastic has cured, for example, by pulling this cured strip with its C-shaped contour in cross-section over a roller that is straight and smooth on its outside. While in contact with the roller, the strip takes on the straight smooth contour of the roller, so that the C-shaped curve on the strip is deformed to a flat profile, as a means of facilitating removal of both outer coverings. This kind of a roller with a straight-line circumferential surface may be provided in front of the removing station for removing both outer coverings, or be incorporated into the removing station. After pulling off both outer coverings, the remaining strip, which now consists only of the cured plastic and the reinforcing fibers, automatically reverts to its groove-like curved shape with the C-shaped cross-section.

The cutting process of cutting the fingernail tips from the strip may, as previously mentioned, be done preferably with a punch, for example, an oscillating or a rotating punch. Alternatively, the cutting process may be done with other known methods, for example, with a laser beam or water jet. Particularly when using a laser cutter or water jet cutter, it is possible to change the cutting contour very quickly, so that it is possible to change the shaping of the fingernail tip to be produced from one shape to another with the shortest possible downtime.

When using the punch, a template tool is preferably used, so that the fingernail tips punched from the strip are created with an optimal texture on their peripheral edge, so that, for example, minimal cracks, breaks, etc. on the peripheral edge of a fingernail tip are best avoided.

Furthermore, the template may be used as a sorting aid. The tips drop down through the template down and are thereby guided in their direction of fall. The tips may then be accurately placed, for example, in a shipping box, or in a certain compartment of an assortment carton that has multiple compartments for receiving multiple different types of fingernail tips. This function as a sorting aid is particularly well embodied when an oscillating lifting punch is used. In this case, a stationary, immovable template may be used, which enables a particularly precise guiding of the tips.

Plastics that are suitable for impregnating the reinforcing fibers include epoxy resins, acrylic resins, unsaturated polyester resins, or polyurethane. These types of plastic enable production of a fingernail tip that is as transparent as possible, as well as having good mechanical stability while maintaining high degree of flexibility.

In the discussion above of a first possibility of a production method, it was mentioned that the strip be constructed as a narrow strip, only wide enough for a single fingernail tip, so that a plurality of tips have to be created one behind the other in the longitudinal direction of the strip. Alternatively, it was mentioned that the strip may be constructed initially in a wider format and then separated into narrower strips, which then, as described above, are impregnated with plastic, covered on both sides, shaped and cured, so that, in this way, several narrow strips can be produced at the same time, each resulting in a single row of fingernail tips. A further possibility for producing such narrow strips is possible, by initially impregnated a wide strip of reinforcing fibers with the plastic. This wide strip is then covered on both sides across the entire width and only then is this "prepreg" cut into several narrow strips, which are then shaped and cured.

If the strip, consisting of the plastic-impregnated reinforcing fibers and the coverings on both sides, is then drawn through a stationary shaper, namely through a curved gap in the shaper, then the strip is shaped exclusively in a direction transvers to its longitudinal direction. If, however, the shapers moves along with the strip, for example, by constructed the shaper on a carriage that oscillates forward and back, or a shaper that has two chain-like circulating areas that contact both sides of the strip, then it is possible, to construct the shaper also as an actual embossing tool, so that the strip is shaped in two directions, namely, as described, transverse to its longitudinal direction, but also in the longitudinal direction. This enables, for example, the natural curvature of a natural fingernail in its direction of growth to be replicated. In this case, the shaper has several troughs on the one side and the corresponding stamps on the other side, which between them, create a three-dimensional hollow space, in which the strip may be shaped and cured.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
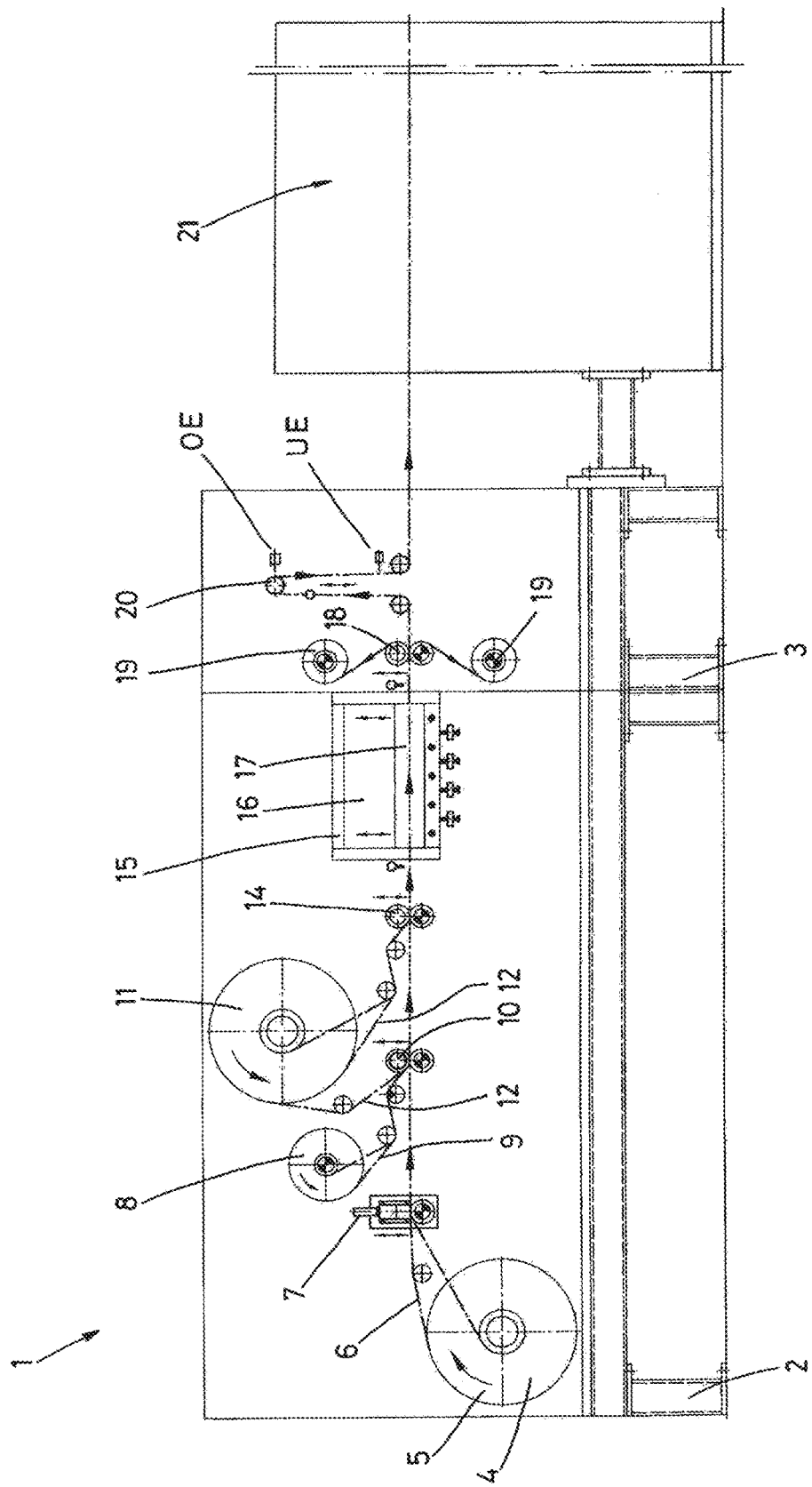
FIG. 1 a side view of a production line for producing fingernail tips.

FIG. 1 is a schematic illustration of a production line 1 for producing fingernail tips in a continuous production process. The production line 1 is set up on two machine frames 2 and 3 and comprises one or two rolls of material for coverings 6 and 12, a roll 8 of a strip of reinforcing fibers 9, equipment for applying a coat of liquid plastic to one or both of the coverings 6, 12, a shaping station 15 for imparting a shape to the fingernail tips, and a cutting station 21 for cutting individual nail tips from the strip 9. The various devices and stations are supported on machine frames 2 and 3, with the exception of the cutting station 21, which is set up separately at the end of the production line 1.

A first tension roller 4 supports a roll 5 of a film that serves as the covering 6. This first tension roller 4 is braked tension roller, which makes it possible to adjust the tension exerted on the covering 6. Just downstream of the first tension roller 4 is a coating roller 7 that is used to apply a liquid plastic to the covering 6. The liquid plastic is preferably a synthetic resin. The coating roller 7 is constructed in this embodiment as a pneumatically adjustable knife and is controlled in a manner that avoids exerting inadmissibly high tension on covering 6. The coating roller 7 has a coating gap that meters the application of the plastic. Two digital gauges are used to measure the coating gap. The accuracies for measuring as well as the read-out of these two gauges makes it possible to apply the desired amount of resin onto the covering 6 with micrometer accuracy. The covering 6 is a very thin polyester film with a smooth surface, so it is possible to adjust the application of the plastic with extreme precision.

The reinforcing fibers are provided in the form of a strip 9 that is wound on the roll 8. This roll 8 is mounted on a drive-controlled tension roller, so that it is possible to adjust the tension on the strip 9 and thereby prevent mechanically destroying the delicate bond or meshing of the reinforcing fibers by excessive tension on the strip 9. The strip 9 is guided from the roll 8 to a first calendaring station 10 that has a motor-driven drum. At this calendaring station 10, the covering 6, along with the plastic that has been applied to it, is pressed against the strip 9 of reinforcing fibers, so that the reinforcing fibers are completely impregnated with the liquid plastic.

A third roll 11 is set up and mounted similarly to the first roll 5. A second covering 12, which, like the first covering 6, is a polyester film, is drawn from this roll 11. Two different possible runs of the covering 12 are shown in FIG. 1: in a first variation, shown on the left, the covering 12 is guided from the roll 11 to the calendar 10, so that the calendar 10, in a single step, brings the lower covering 6, which carries the liquid plastic, and the upper covering 12 into contact with the strip 9, thereby impregnating the reinforcing fibers with the plastic and applying the coverings 6 and 12 to both sides of the strip 9. In a second variation, shown just to the right of the first variation, the strip 9 and the first covering 6 have been brought together in the first calendar 10, but the second covering 12 goes from the roll 11 to a second calendar 14, where it is then applied to the upper uncovered side of the strip 9.

It may be desirable to provide other calendaring stations in addition to the calendaring stations 10 and 14. For example, a total of four calendaring stations may be provided. This allows excess plastic to be applied to the first covering 6, to ensure that the strip 9 is particularly reliably completely impregnated with the plastic, then excess plastic to be pressed out of the strip 9, and air bubbles to be reliably pressed out of two or three layer composition of the strip 9 and the two coverings 6 and 12.

After the two coverings 6 and 12 have been applied to both sides of the impregnated reinforcing fibers, this strip 9, now comprising three layers, goes on to the shaping and curing station 15, which, for reasons of brevity, is simply referred to as the shaping station. Two vertical, double-ended arrows indicate that the shaper is a two component tool, whereby the upper half 16 of the shaper is vertically movable and the lower half 17 is stationary. The two halves 16, 17 are brought together in a manner that creates a gap. Because the one half is movable, the height dimension of the gap is adjustable. Ideally, the fingernail tip to be produced has a curvature that corresponds to the curvature of the natural nail, i.e., a C-shaped profile. To this end, the gap on the shaper has a curved cross-section that extends transverse to the longitudinal direction of the strip 9. The strip 9, together with the two coverings 6 and 12, travels through the gap of the shaper and takes on the desired C-shaped contour in cross-section.

It is necessary that the liquid plastic be cured, so that the C-shaped profile of the strip 9 becomes form-rigid. Curing the plastic is also done in this shaping station 15. The curing may be done by thermal crosslinking or by photo-chemical crosslinking. In photo-chemical curing, some type of radiation is applied to the strip and, in this case, at least one, and preferably, however, both parts 16 and 17 of the shaper are permeable to the specific type of radiation. If the plastic is cured thermally, one or both parts 16, 17 of the shaper either transmit heat or, in a preferred embodiment, are themselves heated.

The production line 1 according to the invention enables a continuous production operation. Because of this, the structural length of this shaping and curing station 15 is in direct correlation with how much time is available for curing the plastic. Should the curing require a particularly long time, or should a post-curing station be provided subsequent to the shaping and curing station, then it is possible, that the right part 3 of the machine frame is not directly connected to the left part 2, as shown in FIG. 1, but is set up a distance away from part 2, so as to provide the necessary space for setting up a longer shaping and curing station 15 or an additional post-curing station.

A stripping or draw-off station 18 having a motor-driven double stripping roller is shown downstream from the shaping station 15, in the forward travel direction of the strip 9. This stripping station 18 serves strips the coverings 6 and 12 from the strip 9 and also serves as the master drive for the entire production line 1. This master drive controls the rotational speeds of the other motor-driven rollers that are used, such as the roller 8, the coating roller 7, and the calendars 10 and 14.

The stripping station 18 has two rollers, the circumferential surfaces having a straight contour, so that the strip 9 that is shaped in the shaping station 15 to have one or more grooves that extend across the width of the strip is flattened, i.e., deformed, when it goes through the stripping station 18. This deformation allows both coverings 6 and 12 to be removed, leaving the middle layer, i.e., the strip 9 of reinforcing fibers that have been impregnated with the plastic and shaped, to continue forward travel. In the embodiment shown, the two coverings 6 and 12 are wound on two winding drums 19. Depending on the material used for the coverings, the coverings on the winding drums 19 may be recycled or processed as waste. In the embodiment described herein, the coverings 6 and 12 are polyester films, so the material may either be recycled with other polyester material or be re-used. For example, the wound roll 19 may be mounted onto the tension rollers to replace the two rolls 5 and 11.

Figure 2:
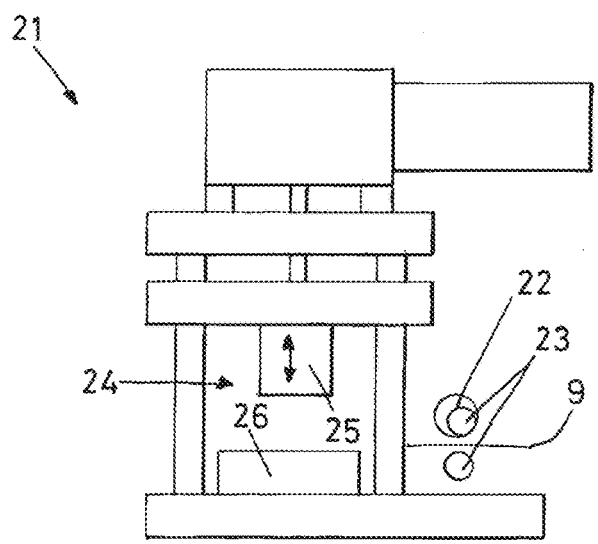
FIG. 2 a side view of the cutting station in the production line of FIG. 1.

The strip 9, now shaped and cured, finally travels into the cutting station 21, shown only schematically as a rectangle in FIG. 1 and which is explained in greater detail with reference to the FIGS. 2 and 3. FIG. 2 shows the cutting station 21 from the side, from the same angle of view of FIG. 1. A servo-motor 22 is indicated on the right, which, with the help of two driver rollers 23, pulls the strip 9, whereby in this area of the cutting station 21 the remaining strip 9 is only production waste, because the fingernail tips have already been cut from the strip 9.

In this embodiment, the fingernail tips are cut from the strip 9 by means of a punch 24. The punch 24 is constructed as a template tool with an upper part 25 that is movable up and down, indicated by the double-ended arrow, and a stationary lower part 26. It is also understood that the punch parts may be reversed, i.e., the upper part 25 may be stationary and the lower part 26 movable up and down against the upper part 25. The fingernail tips drop down under force of gravity away from the cutting station 21. The stationary lower part 26 shown in the figure also serves as a guide, to guide the fingernail tips in a particularly reliable manner into a sorting device. These falling fingernail tips are caught and sorted, as will be described with reference to FIG. 3.

Figure 3:
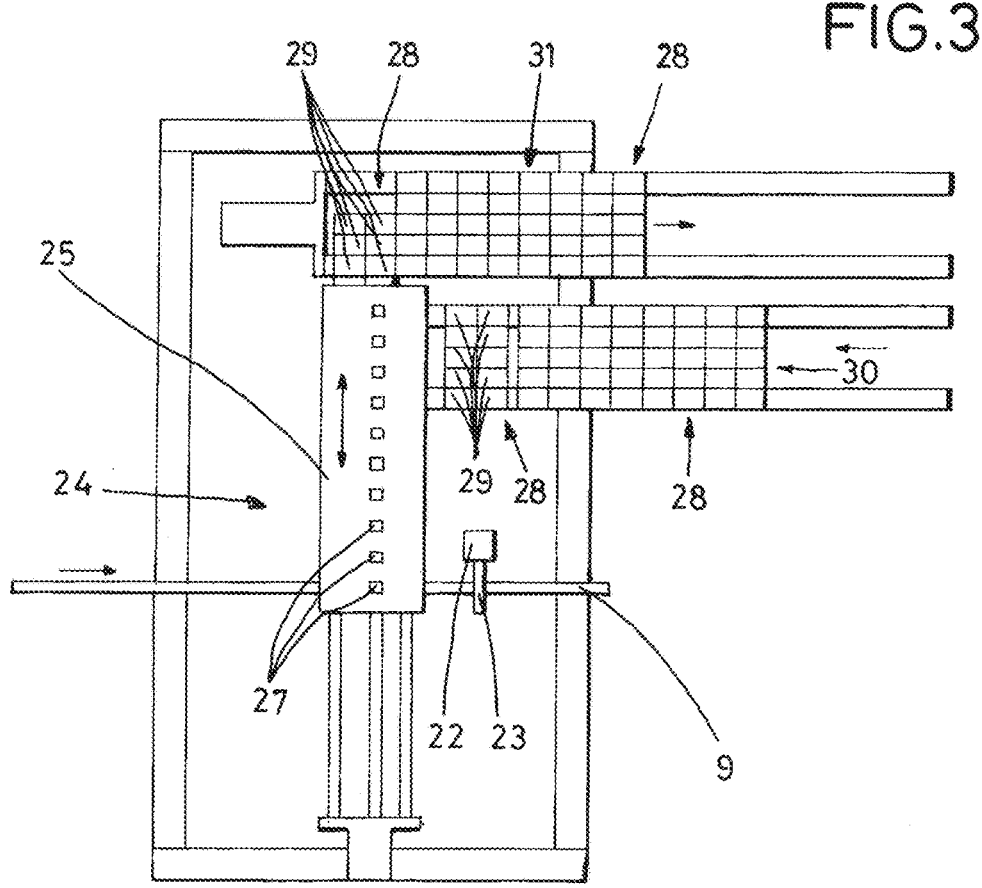
FIG. 3 is a top plan view of the cutting station of FIG. 2.

FIG. 3 is a top plan view of the cutting station 21. The direction of travel of the strip 9 is from left to right in this figure. From this view it is clear that the upper part 25 of the punch has a plurality of single, schematically indicated punch elements 27. This upper part 25 is also is movable back and forth in a direction transverse to the direction of travel of the strip 9, as indicated by the double-ended arrow. The punch elements 27 include differently dimensioned punches, i.e., punches perhaps of varying sizes, varying curvatures, etc., so as to be able to punch fingernail tips of different sizes and curvatures from the strip 9. In this embodiment shown, the strip 9 is relatively narrow and only one selected punch element 27 of the plurality of punch elements is used in a single punch operation. The lower part 26 of the punch 24, together with the upper part 25, may also be movable. Each punch element 27 is perfectly fitted to a recess in the lower part 26.

The production line 1 according to the invention provides a continuous forward travel of the strip 9, even if the punching operation is temporarily interrupted for a tool change, to change out one punch element 27 for a different one. A buffer is provided downstream from the stripping station 18 and in front of the cutting station 21 to take up a length of the strip 9. The buffer has a deflecting roller 20 that is able to move up and down between an upper limit position OE and a lower limit position UE. The distance between the limit positions OE and UE and the position of the deflecting roller 20 is determined according to the size of the buffer and the length of the strip 9 that is temporarily stored there.

During the tool change in the cutting station 21, the buffering for the strip 9 is increased by moving the deflecting roller 20 upward. After the tool change, the strip 9 is pulled out of the cutting station 21 at the two driver rollers 23 at a greater speed than the speed at which the strip 9 enters the buffer. The supply of strip in the buffer is, thus, decreased and as a result, the deflecting roller 20 moves downward. When the deflecting roller 20 has reached a pre-determined height, for example, has reached the lower limit position UE, the punch 24 is operated at a lower speed, for example, at a so-called normal speed, so that the strip 9 in the cutting station 21 is processed at the same speed and is moved through the cutting station 21 at the same through-put speed as the speed of the upstream stations in the production line 1. In this case, the deflecting roller 20 remains at its normal height.

FIG. 3 also shows that a fully automated sorting is possible: So-called assortment cartons 28 with a plurality of individual compartments 29 arrive beneath the cutting station, as indicated by the horizontal arrows, where they are automatically guided beneath the strip 9, precisely there where the fingernail tips are cut from the strip 9 by means of the punch 24. The fingernail tips drop into an assortment carton 28, and particularly, into a pre-defined compartment 29.

The number of compartments 29 per assortment carton 28 can, for example, correspond to the number of punch elements 27 in the punch 24. In this case, an assortment carton 28 may be moved bit by bit beneath the cutting station 21, such, that with each change of the punch element 27, the corresponding different fingernail tips drop into one of the compartments 29 of the assortment carton, so that each type of fingernail tip is not mixed with other types. When the different fingernail tips have been collected in the intended quantity, and accordingly, all compartments 29 of the assortment carton 28 have been filled, the assortment carton 28 is automatically moved away from the area of the cutting station 21 and transported to a packing station. The appropriate input storage 30 and output storage 31, each provided with multiple assortment cartons 28, are shown in FIG. 3.

In contrast to the process described above, initially just one sort of fingernail tips may be produced in a greater quantity and multiple assortment cartons 28 filled just with this sort of fingernail tip. This has the advantage of reducing the number of tool changes. In that case, only one defined compartment 29 of each assortment carton 28 is filled with this sort of fingernail tip. The tool is subsequently changed and then, all of the assortment cartons 28 re-positioned beneath the cutting station 21, so that the different sort of fingernail tip that is now being produced, for example, a fingernail tip of a different size, drops into a different compartment 29 in each of the assortment cartons 28. The input and output storages may also be used for this type of production, to store partially filled assortment cartons 28 until they have been completely filled.

The correct metering of the fingernail tips into the individual compartments 29 of the assortment cartons 28 is ensured by means of an automatic counter, which automatically counts the fingernail tips that drop from the cutting station 21, so that, in the end, the production of fingernail tips in great quantities and then the sorting and packing of the assortment cartons 28 is fully automated.

A tool change may also be provided for in the area of the shaping station 15, in order to produce strips 9 with varying radii of curvature with the same production line 1.

It is understood that the embodiments described herein are merely illustrative of the present invention. Variations in the construction of the [inventive device] may be contemplated by one skilled in the art without limiting the intended scope of the invention herein disclosed and as defined by the following claims.

What is claimed is:

1. A method for producing fingernail tips, the method comprising the steps of:
    a) providing a strip of reinforcing fibers that has a defined forward travel speed;
    b) impregnating the strip with a plastic;
    c) covering the strip on one side with a covering;
    d) continuously feeding the strip to a shaping station and shaping the strip and plastic to obtain a curved strip with a curved groove that extends in a longitudinal direction of the strip, the groove having a curve that corresponds to a curvature of a natural fingernail or toe nail;
    e) curing the plastic to obtain a cured strip that retains a curved shape;
    f) removing the covering from the cured strip;
    g) cutting fingernail tips from the cured strip; and
    h) automatically sorting the fingernail tips into a container.

2. The method of claim 1, wherein step c) includes the step of:
    c1) applying a covering to both sides of the strip.

3. The method of claim 2, further comprising the step of:
    k) controlling a tension on one covering that is being drawn from a roll such that this tension is adapted to be substantially the same as a tension of the other covering.

4. The method of claim 2, further comprising the step of:
    m) calendering the strip after a first covering has been applied to the strip and before a second covering is applied.

5. The method of claim 4, further comprising the step of:
    n) calendering the strip after being covered with the second covering, thereby removing air bubbles that are possibly between the reinforcing fibers and the second covering.

6. The method of claim 1, further comprising the step of:
    i) providing the strip of reinforcing fibers and the covering each as a roll.

7. The method of claim 6, further comprising the step of:
    j) monitoring a tension on the strip and the covering and controlling a speed of drawing the strip and the covering from their respective rolls as a function of the tension, so as to avoid exceeding an admissible maximum tension on the strip and on the covering.

8. The method of claim 1, wherein step b) includes applying the plastic to one side of the covering and step c) includes bringing the strip of reinforcing fibers into contact with the one side of the covering that is coated with the plastic.

9. The method of claim 8, wherein the plastic is applied to the covering by means of a coating roller that has an adjustable coating gap.

10. The method of claim 8, further comprising the step of:
    l) calendering the strip after the covering with the plastic has been applied to the strip, thereby effecting a complete impregnation of the reinforcing fibers with the plastic.

11. The method of claim 1, wherein step d) includes the steps of:
    d1) providing a shaper in the shaping station that has a C-shaped curved gap that extends transverse to the longitudinal direction of the strip, and
    d2) drawing the strip through this C-shaped curved gap of the shaper, thereby forming a groove in the longitudinal direction on the strip.

12. The method of claim 11, step d) including the following step:
    d5) moving the shaper in the shaping station in the direction of travel of the strip such, that a relative speed results between the strip and the shaper, the relative speed being less than the forward travel speed of the strip.

13. The method of claim 11,
    d6) moving the shaper in the shaping station essentially at the forward travel speed of the strip such that a relative speed between the strip and the shaper is essentially avoided.

14. The method of claim 1, wherein the step d) includes the following step:
    d3) using a shaper that has two guide rollers that make contact with the strip and that are spaced apart from each other and placed in the longitudinal direction of the strip,
    and that have a peripheral concave surface or a peripheral convex surface, each surface being in contact with the strip; and
    d4) drawing the strip between the two guide rollers and thereby imparting a groove-like shape to the strip that extends in the longitudinal direction of the strip.

15. The method of claim 1, wherein the plastic is thermally cured in the shaping station.

16. The method of claim 1, wherein the plastic is cured in the shaping station by means of a radiation source.

17. The method of claim 16, wherein the covering on the strip that is facing the radiation source is permeable to yet resistant to radiation emitted by the radiation source.

18. The method of claim 1, further comprising the step of:
    o) providing a stripping device downstream of the shaping station that draws the strip out of the shaping station and strips the covering from the strip.

19. The method of claim 18, further comprising the step of:
    p) controlling the forward travel speed of the strip of reinforcing fibers, as well as a travel speed of the covering that is applied to the strip as a function of a travel speed of the stripping device.

20. The method of claim 18, wherein the cutting the fingernail tips from the cured strip occurs at a cutting station, further comprising the step of:
    q) providing a buffer for the cured strip downstream from the stripping device and upstream of the cutting station, to take up a continuous feed of the cured strip to accommodate intermittent operation at the cutting station.

21. The method of claim 20, wherein the strip is guided into a loop, and wherein a length of the loop is changed by means of a position-changeable deflecting roller.

22. The method of claim 21, wherein step g) includes the step of:
   g1) cutting the fingernail tips are cut from the cured strip by means of a punch.

23. The method of claim 22, the step g) further including the step of:
   g2) controlling the operating speed of the punch as a function of the position of the position-changeable deflecting roller, wherein the deflecting roller is movable between an upper limit and a lower limit, and wherein the length of the loop is determined by the position of the deflecting roller between these two limits.

24. The method of claim 1, wherein step d) includes the following step:
   d7) providing multiple shapers having multiple geometries, and
   d8) automatically changing out a first shaper for a second, different shaper, so as to produce differently shaped and/or differently sized fingernail tips.

25. The method of claim 1, wherein step g) includes the step of:
   g3) providing multiple punches, each punch having a different geometry, so as to produce differently sized fingernail tips.

* * * * *